United States Patent [19]

Wendel et al.

[11] Patent Number: 5,259,763
[45] Date of Patent: Nov. 9, 1993

[54] METHOD OF USING ACTIVE LEARNING MAPS

[75] Inventors: LeRoy V. Wendel, Lakefield; Steve Kerska, Houston, both of Minn.

[73] Assignee: High Touch Learning, Inc., Austin, Minn.

[21] Appl. No.: 723,180

[22] Filed: Jun. 28, 1991

Related U.S. Application Data

[63] Continuation of Ser. No. 520,081, May 7, 1990, abandoned, which is a continuation of Ser. No. 350,233, May 11, 1990, abandoned.

[51] Int. Cl.$^5$ .................... G09B 29/00; G09B 29/10
[52] U.S. Cl. ............................ 434/150; 434/153
[58] Field of Search ............. 434/150, 151, 152, 153, 434/130; 273/DIG. 30

[56] References Cited

U.S. PATENT DOCUMENTS

| 4,937,181 | 6/1990 | Rogers | 434/150 |
| 5,080,591 | 1/1992 | Forsyth | 434/147 |

Primary Examiner—Gene Mancene
Assistant Examiner—Cindy A. Cherichetti
Attorney, Agent, or Firm—Hugh D. Jaeger

[57] ABSTRACT

Silk screened United States, world, regional or individual continent, country and state maps on a looped backed material, which illustrate the outline of the states, countries, as well as the location of pertinent rivers, water bodies and major cities/capitals. The locations are not labeled on the map, but instead, location names are provided on a small tab. At least one small square of hook material attaches to the backside of the tab, and can be correctly placed on the map at predetermined points and easily removed from the map for further usage. The hooks on the tab engage into the loops of the map. Other activities can be utilized, such as numbers, spellings, or other educational activities with hooked tabs engaging onto the loop material.

3 Claims, 3 Drawing Sheets

METHOD OF USING ACTIVE LEARNING MAPS

CROSS REFERENCE TO CO-PENDING APPLICATIONS

This application is a continuation of U.S. Ser. No. 07/520,081, filed on May 7, 1990, now abandoned, entitled "Method and Apparatus to Increase Geographic Awareness Through the Use of Active Learning Maps", which is a continuation of U.S. Ser. No. 07/350,233, filed on May 11, 1989, now abandoned, entitled "Method and Apparatus to Increase Geographic Awareness Through the Use of Active Learning Maps", both to the same assignee as this patent application.

BACKGROUND OF THE INVENTION

1. Field of the Invention

The present invention pertains to an educational teaching map, and more particularly, pertains to an educational teaching map of loop material with location tabs of hook material.

2. Description of the Prior Art

Prior art maps have utilized tabs or labels attached with adhesive. This has not provided an easy "see and remember" or "do and understand" approach, but more a "hear and forgot" approach. In other prior art methods, students use prior art markers to label the map. The marker approach proved to be messy and continual wiping of the surface eventually left the map smeared or scratched. Other prior art maps require pins to attach information. This leaves holes in the map and tabs.

Prelabeled maps are generally congested so that it is difficult for students to sort out all the information or to see the development of an event over time. For example, Civil War maps show the entire war. The map of the present invention allows the student t place tabs representing various developments prior to the outbreak and during the war by year. Thus, the students can see an event develop over time.

Maps currently on the market deal with specific subjects (political maps, relief maps, population maps, historical maps, etc.). Thus, the present invention map has the advantage of being useable in a variety of disciplines (science, social studies, home economics, agriculture, English, etc.). Each discipline can use the base map by simply purchasing the tab packet that applies to their classroom. For those classrooms where a map is not used daily, the library could purchase the base map so that teachers could check it out on the days it would be used in the classroom. The present invention map also involves the student in active participation in the lesson. The student does not just look at a map in the text or on the wall, but is involved in the topic development on the map.

The present invention overcomes the disadvantages of the prior art by providing hook and loop hooked material tabs to engage a loop material for a specific subject.

SUMMARY OF THE INVENTION

The general purpose of the present invention is to provide a looped learning map with hooked material tabs which affix to the learning map on various subjects, such as science, social studies, home economics, agriculture, English, etc.

According to one embodiment of the present invention, there is provided a hook and loop teaching map with color coded hooked tabs which affixes to silk screened loop material for various subjects.

One significant aspect and feature of the present invention is the students' active involvement in the subject or topic development of the map in a "see and remember" or "do and understand" scheme.

Another significant aspect and feature of the present invention is that hooked color coded tabs can be placed and removed repeatedly on the looped material without the mess commonly associated with chalk/marker labeling techniques, or the holes associated with tabs placed on the map with pins.

Another significant aspect and feature of the present invention is color coded tabs to help students identify specific educational features.

A further significant aspect and feature of the present invention is starting with blank silk screened subject matter material and placing the tabs onto the material which assists the student develop an educational concept.

Another significant aspect and feature of the present invention s that the material allows the user to change the topic by using a variety of tab packages. Thus, the material is not only able to show a multitude of topics, but can also be used by a variety of disciplines.

Yet a further significant aspect and feature of the present invention is that the material is not limited to activities suggested by the manufacturer, but by the user's imagination since the user can easily make tabs to meet the specific needs.

Having thus described the embodiments of the present invention, it is the principal object hereof to provide a hook and loop teaching loop material with hooked instructional tabs.

One object of the present invention is to provide a blank hook and loop teaching loop material with hooked material tabs which assists students see the development of a particular concept.

Another object of the present invention is to provide color coded tabs to help students identify specific features.

A further object of the present invention is to provide a variety of tab packages on a multitude of topics for a variety of disciplines.

Yet another object of the present invention is that the user can easily make tabs to meet the specific need of a particular discipline.

Additional objects of the present invention include that the material upon which the map is printed is different from the maps currently on the market. The present invention allows the student to place tabs representing various developments prior to the outbreak and during the war by year. Thus, the students can see an event develop over time. The tab approach allows the user to change the instant map to whatever subject he or she wishes to deal with at that particular time.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
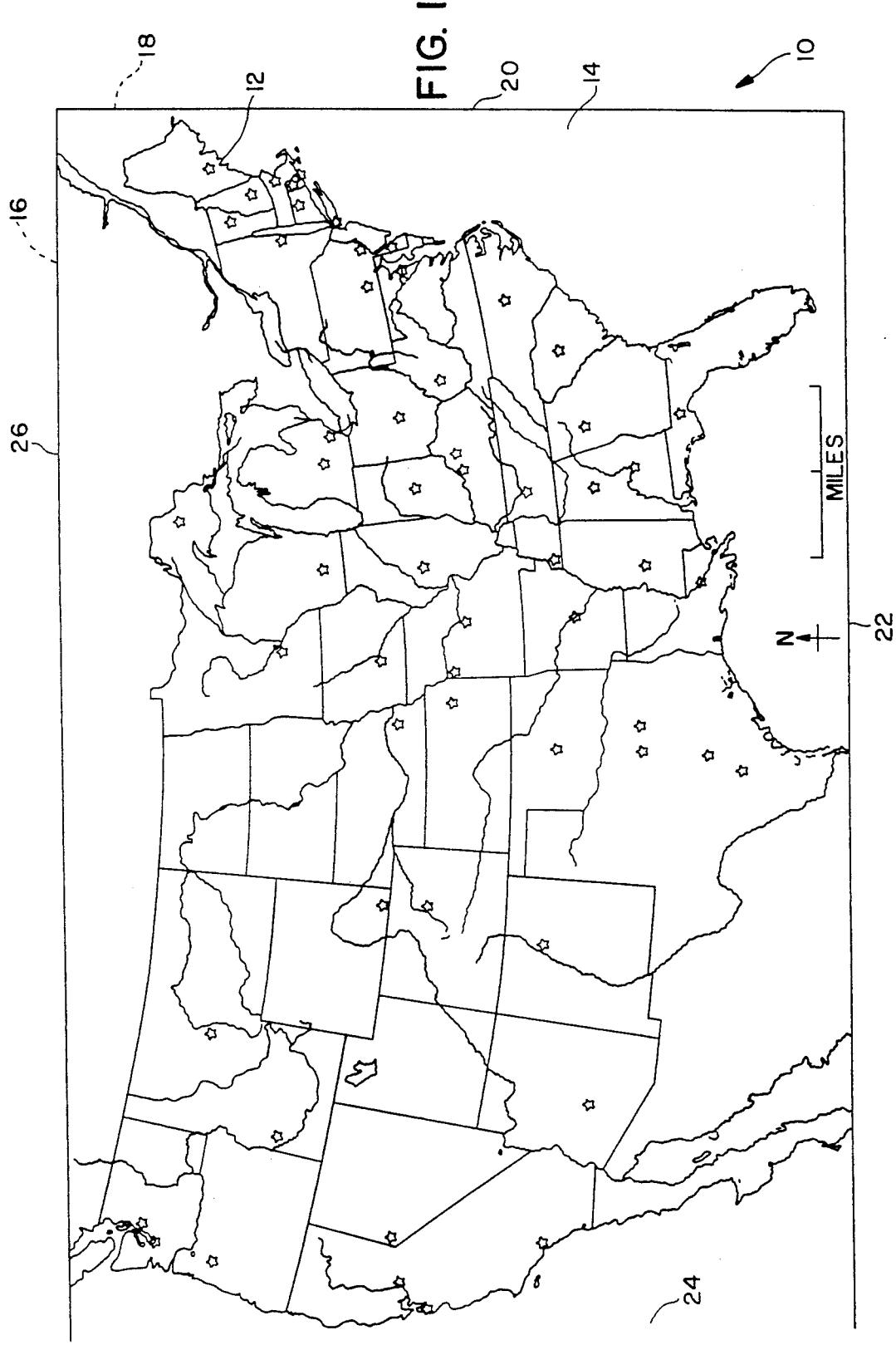
FIG. 1 illustrates a plan view of a blank United States map silk screened onto loop material.
Figure 2:
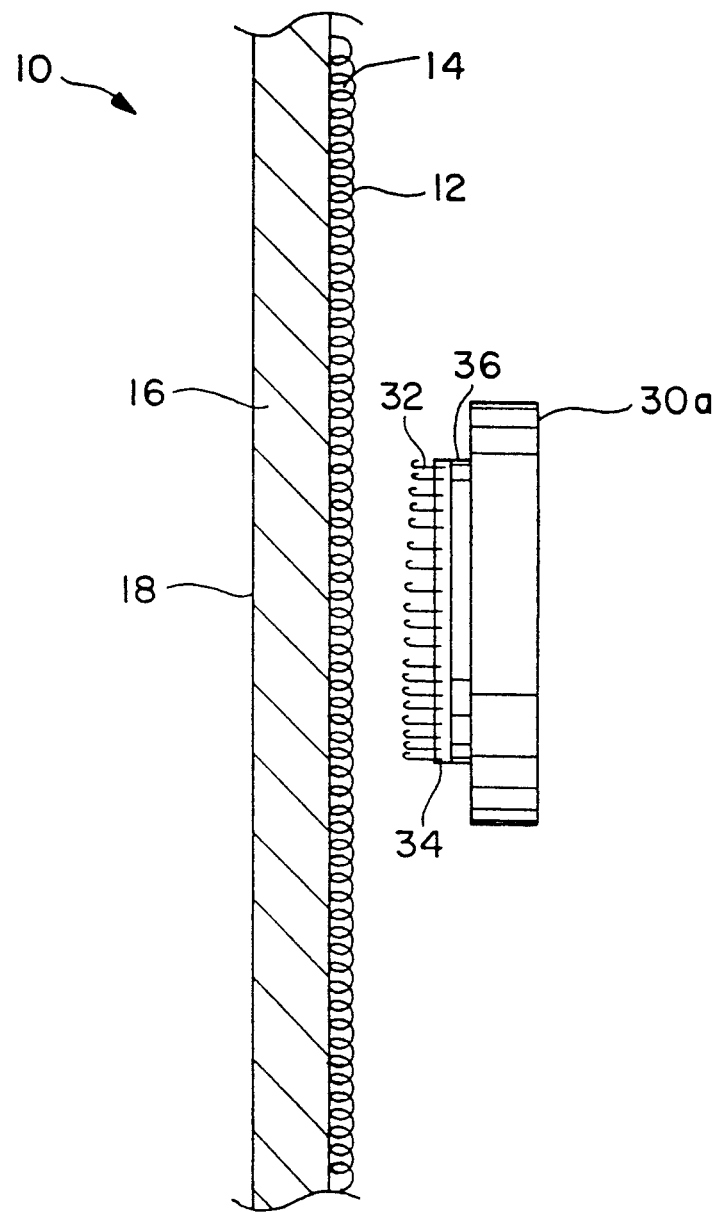
FIG. 2 illustrates a sectional side view of the United States map with hooked educational tabs affixed thereto; and, FIG. 3 illustrates a blank World map.

FIG. 1 illustrates a plan view of a blank United States map 10 with educational material silk screened 12 onto a loop material 14, which is on a rubberized backing 16. The silk screen process can include a multitude of color runs, such as black and two different blues. The fabric color, such as platinum, is used for the land colors. The fabric is then secured to a rigid or flexible backing 18 of a suitable material. The edges 20, 22, 24, and 26 can be bordered with framing material 28. The map size is 72×39 inches by way of example and for purposes of illustration only. Tabs 30a-30n, as illustrated in FIG. 2, are made of a rigid material, such as polyethylene, and can be color coded to denote a specific feature (state, country, ocean, mountain, etc.). Hooks 32 on material 34 attaches to the backside of the tabs 30a-30n through adhesive 36 which allows the user to latch the tabs 30a-30n to the loop material of the map. The silk screened subject matter of the map 10 or the informational material of the tabs 30a-30n can be changed, thereby changing the educational process. Suitable hook and loop materials can include VELCRO or SCOTHMATE. The tabs can be of a rigid, non-rigid, flexible vinyl.

FIG. 2 illustrates a sectional side view of the silk screened looped United States map 10 with hooked material tabs 30a-30n affixed thereto. All other numerals correspond to those elements previously described. The map 10 includes a rigid backing 18, a backing material 16, loop material 14, and silk screened information 12.

Figure 3:
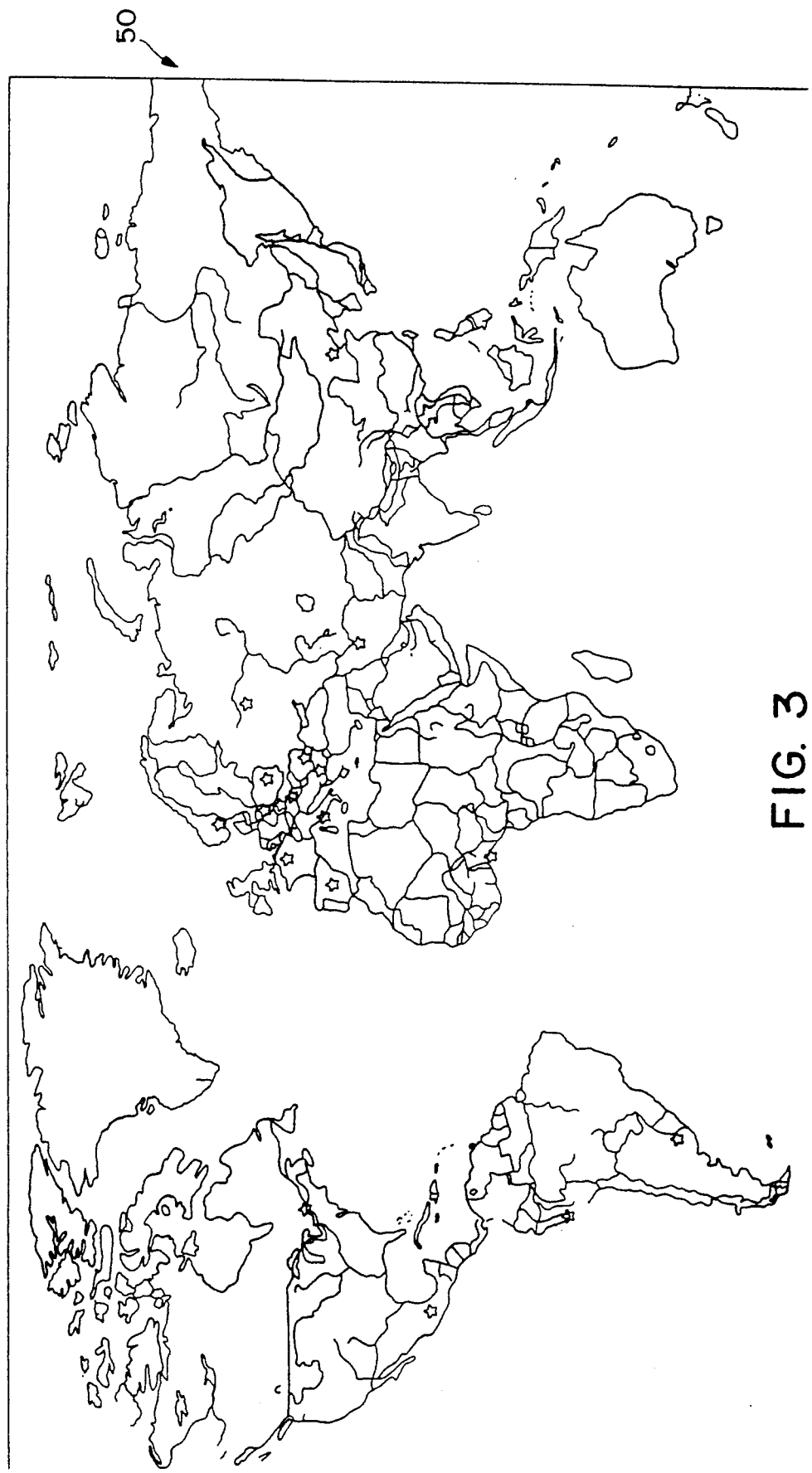

FIG. 3 illustrates a blank World 50 silk screened onto loop material.

MODE OF OPERATION

The hook and loop teaching instruction material allows the student to become involved in the learning process through active participation in the lesson. The maps, by way of example and for purposes of illustration, are essentially large blank maps which show the outlines of states/countries, and various major water bodies, rivers and cities. More detail may be added by the user as so desired The size allows the map to be used for large group, as well as small group and individual activities. Suggested teaching activities and map keys are included with each map. Each user can adapt the map to his or her particular style of teaching.

The map can be used in other disciplines besides social studies. English teachers may have students use the map to locate the setting of a story or place pictures of regional authors. Home Economics teachers can use the map to show regional foods and the location of the natural fibers for textile production. Science teachers can have students locate various mineral deposit and fossil fuels (for example, energy producing states). The aquifers and biomes can also be placed on the map. Agricultural teachers may use the map to identify leading states producing a particular agricultural product.

The following tables, by way of example and for purposes of illustration only, are for purposes of illustrating the principals of one embodiment of teaching applications.

TABLE 1

Mexico
Canada
Atlantic Ocean
Pacific Ocean
Rocky Mts.

TABLE 2

Gulf of Mexico
Atlantic Coastal Plain
Gulf Coast Plains
Great Plains
Central Plains
Appalachian Mts.

TABLE 3

Piedmont Plateau
Ozark Plateau
Edwards Plateau
Cumberland Plateau
Colorado Plateau
Columbia Plateau

TABLE 4

Sierra Nevada Mts.

| | | |
|---|---|---|
| Cascade Mountains | Delaware | Pennsylvania |
| New Jersey | Georgia | Connecticut |
| Massachusetts | Maryland | South Carolina |
| New Hampshire | Virginia | New York |
| North Carolina | Rhode Island | Vermont |
| Kentucky | Tennessee | Ohio |
| Louisiana | Indiana | Mississippi |
| Illinois | Alabama | Maine |
| Missouri | Arkansas | Michigan |
| Florida | Texas | Iowa |
| Wisconsin | California | Minnesota |
| Oregon | Kansas | West Virginia |
| Nevada | Nebraska | Colorado |
| North Dakota | South Dakota | Montana |
| Washington | Idaho | Wyoming |
| Utah | Oklahoma | New Mexico |
| Arizona | Alaska | Hawaii |

TABLE 5

| | | | |
|---|---|---|---|
| New York | Las Vegas | Helena | Los Angeles |
| Olympia | Philadelphia | San Diego | Boise |
| Pittsburgh | San Francisco | Cheyenne | Baltimore |
| Portland | Salt Lake City | Miami | Seattle |
| Oklahoma City | Tampa Bay | Dover | Santa Fe |
| Jacksonville | Harrisburg | Phoenix | Birmingham |
| Trenton | Janeau | Memphis | Atlanta |
| Honolulu | Louisville | Hartford | Cincinnati |
| Boston | Cleveland | Annapolis | Detroit |
| Columbia | Chicago | Concord | Milwaukee |
| Richmond | Minneapolis | Albany | St. Louis |
| Raleigh | Kansas City | Houston | Providence |
| New Orleans | Montpelier | Frankfort | San Antonio |
| Nashville | Dallas | Columbus | Ft. Worth |
| Baton Rouge | Indianapolis | Jackson | |

TABLE 6

| | | |
|---|---|---|
| Great Salt Lake | Ohio River | Springfield |
| Lake Superior | Cumberland River | Montgomery |
| Lake Michigan | Tennessee River | Augusta |
| Lake Huron | Alabama River | Jefferson City |
| Lake Erie | James River | Little Rock |
| Lake Ontario | Hudson River | Lansing |
| Sacramento River | Yukon River | Tallahassee |
| Columbia River | | Austin |
| Snake River | | Des Moines |

TABLE 6-continued

| | | |
|---|---|---|
| Colorado River | Mojave Desert | Madison |
| Missouri River | Great Basin | Sacramento |
| Platte River | Painted Desert | St. Paul |
| Yellowstone River | Sonoran Desert | Salem |
| Arkansas River | Great Salt Lake Desert | Topeka |
| Rio Grande River | Sevier Desert | Charleston |
| Red River | Amargosa Desert | Carson City |
| Des Moines River | | Lincoln |
| Mississippi River | | Denver |
| Illinois River | Coast Range | Bismarck |
| Wabash River | | Pierre |

TABLE 7

Great Smoky Mts.
Blue Ridge Mts.
Allegheny Mts.
Cumberland Mts.
Adirondack Mts.
Green Mts.
White Mts.
Catskill Mts.
Teton Mts.
Bitterroot Mts.
San Juan Mts.
Sangre de Cristo Mts.
Clearwater Mts.
Salmon River Mts.

TABLE 8

| 1 | 2 | 3 | 4 | 5 |
|---|---|---|---|---|
| 6 | 7 | 8 | 9 | 10 |
| 11 | 12 | 13 | 14 | 15 |

TABLE 9

1. States
2. Capitals/Major Cities
3. Rivers/Water Bodies
4. Mountains/Plains/Plateaus/Deserts/Hills
5. Review Numbers
6. Geographic Regions of the United States
7. Leading Economic Activities of the Region
8. Geographic Landmarks
9. Historical Landmarks
10. Points of Interest
11. Biomes - Plant/Animal Life
12. Settling the U.S.
    a. Native Americans
    b. Europeans - Exploration and Settlement
    c. Roads and Trails West
    d. Movement West - Pre-Civil War
    e. Movement West - Post Civil War
    f. Immigration - Old/New/Present
13. Wars
    a. French and Indian
    b. Revolutionary
    c. 1812
    d. Civil War
    e. Indian
14. Regional Authors/Major Works
15. Resources of the United States
16. Folklore of the United States
17. Time Zones
18. Professional Teams (City Locations)
19. Elections
    a. President/residences at election
    b. Electoral vote
    c. Congressional
    d. State Offices
20. Trip Game
21. State Birds/Flowers

TABLE 10

1. Continents/Islands/Peninsulas/Isthmus

TABLE 10-continued

2. Rivers/Water Bodies/Straits
3. Mounts/Deserts
4. Review Numbers
6. World Biomes - Plant/Animal Life
7. Age of Discovery
8. World Resources/Major Producing Countries
9. Our Cultural Heritage - World Literature
10. World Migration - Early Man
11. Ocean Currents
12. Countries
13. Defense Alliances
14. Economic Alliances
15. Time Zones
16. Ancient Civilizations
17. World Explorers
18. Economic Interdependence
19. World War I and II

Map Activities Using Direction/Exploring Relationships

By way of example and for purposes of illustration only, using the moveable compass, place the compass on the map so that north on the compass is pointing the same direction as the direction arrow on the map is pointing. Students can now see according to the compass, that the right side of the map is east, the bottom is south and the left side is west.

The teacher can have a student place the name tags of his/her home state on the map. Now placing the moveable compass on that state, the teacher can ask what sate, country, or body of water is north, east, south and west of the student's home state. Individual students may volunteer to place the correct tabs on the map. When the teacher feels that the students know their map directions, this exercise may be repeated without the compass.

As students become aware of the location of the other states, the moveable compass may be used by a student to challenge another student to name what is north, east, south and west of the state upon which the student has placed the compass. Again, as students become more familiar with map directions, this exercise may be repeated without the compass.

Students may be asked to place the state name tags on states in which they have lived, visited or have relatives living. Name tags of other states which the students can identify may also be placed on the map. This provides an opportunity for the teacher to determine which states cannot be identified and which students may need help.

Students may be asked to clip a news article with a dateline or that mentions a city/state in the article. Place the headline and first paragraph on poster board and attaching a piece of hook and loop, allows the students to create their own weekly current event map.

Activities Using Longitude and Latitude Time Zones

The map may be used to help students learn lines of longitude and latitude. After giving the location in degrees, the teacher may ask the student to place the correct state or city tab at the location. If students do not know the states or cities, then the teacher may place the tabs on the map before the exercise and have the students remove the correct tab when given its approximate location by degrees.

The teacher can have the class determine how many time zones the U.S. has by providing certain information. Each time zone is 15 degrees. Using the lines of longitude and the lines of latitude for the beginning of the first time zone, the students can determine how many time zones are found in the U.S. Once the correct answer is determined, the students can determine which states are in which time zone. Allowance must be made for various state adjustments and the fact that lines of longitude on flat maps are somewhat distorted.

Using several clocks, the teacher may place a clock on the map and challenge a student to come forward to select the clock which shows the correct time for a state/city in another time zone. This exercise helps the student review the states/cities and to apply his/her knowledge of time zones.

Activities Involving Population/Migration

The mobility of a society can be shown by having each student list their birth place, as well as their parents and grandparents Then using the letters S, P, and GP, write the number of students, parents and grandparents (S11-2, P-3) born in a particular state on a poster board tab. Next have the students place the tab on the correct state Using a different colored tab for each group would help the students determine the degree of mobility, if any, that has occurred in the lives of their families and classmates, families. If the class is small enough, each student may make personal tabs. First select three colors which all students will use. Once the students have determine which color represents students, parents and grandparents, have them write their names on the student color, their name and a P on the parent tabs, and their name and GP on the grandparent tab. Each student can place his/her tabs correctly on the map.

If the teacher simply wants the students to be aware of some of the large cities in the U.S., then the students can use the city tabs and review numbers to locate the top 10 or 15 cities in population. After having located the cities, you can have the students speculate why these cities grew to the largest. What role did geography, transportation, etc. play in their development.

To show which direction Americans are moving, you can compare the top ten cities in population of various decades with the top ten of the 1980s. The teacher may wish to provide the population information and have the students locate the cities using the city name tabs. The review numbers may be used to show the city's ranking.

Many students follow various professional sports. Tabs can be made showing each team's logo. Students can learn the location of many major cities by placing the logo next to the city in which the team plays (not all professional sports cities are on the map). Again, have students determine as to why teams are located where they are. Showing the location of teams by decades (40s, 50s, 60s, 70s, and 80s) also may help students to see population movement to the south and west. Moving the teams to where they are playing during the week or on the weekend would help reenforce the location of various major cities.

Exploring Geographical Regions

Students can show the various regions of the U.S. (New England, Mid-Atlantic States, etc.) by placing different colored circles or different geometric shapes on the states Which make up those regions.

After studying the different landforms, students can use the packet of U.S. mountains, plateaus, plains and hills to locate specific mountains, plateaus, plains and hills found in the U.S. Once the examples are placed correctly, the teacher may ask the student to draw a relief silhouette of the U.S.

Using common vegetation symbols, students can locate the vegetation regions found in the U.S. Students may be asked if vegetation provides any clues regarding the climate of an area.

Students can determine the major economic activity of various areas of the U.S. by placing symbols on the map to show the major economic activities found within a particular state. The teacher can ask the students what role geography plays in these leading activities.

Using the city tabs, students can identify major U.S. cities found in the region. The teacher may wish to have students determine why some regions have more major cities than others and why cities are located where they are.

Many of these activities could be done while taking an imaginary trip through the U.S. Students could construct the map while taking the trip and record their observations in such areas as landforms, vegetation, major economic activities, major cities, rivers, etc. in a log.

Interdependence of the states can be shown by having students cut the brand name and the name of the company and its location from products found in their homes. For example, the teacher may select a meal to see what the students ate for breakfast, lunch or dinner. The information may be glued to a small poster board tab and placed on the map where the company is located. This activity could be ongoing as students try to find a product from each state.

Historical/Political Application

American history classes can use the dates of entry into the union on the state tabs to learn the original thirteen colonies/states. As students study the movement west, the other states can be placed on the map according to their order of entry.

Using different colored shapes, the students can identify the land areas of the various territories which were added to the original thirteen states to create the present day shape of the U.S. Along the name tags for the territories and the country from which the land was acquired, symbols can be created to represent the method of acquiring the land. A picture of the president in office may also be added to the map.

The map can be used to analyze presidential elections. Using different colors for Republicans and Democrats, have the students place Rs and Ds on the states, as well as the state's electoral vote. This allows the student to see any regional trends that have occurred in the election. The makeup of a state's delegation to Congress by party affiliation, as well as the party of its governor may be placed on the map to determine if there is a difference in a state's national and state voting pattern. If such a difference appears, students can be asked to give some reasons for the difference.

Students may be asked to clip current news articles that identify social/economic, environmental, or other major social problems facing the nation (examples, acid rain, illegal immigration, oil spill pollution, drug trafficking, homelessness, etc.). By placing the headline and first paragraph in the state/region, the student can see which state/region is most directly affected by the problem.

Review Number Usage

Review numbers can be used to give a quiz of 15 items. Simply by placing the numbers on the map, the teacher can have the students name the state, city, etc. which would match the number's location. Review numbers can be used to help the students learn to spell. Using the first letter of state names, the teacher may place the numbers so that number one is the first letter of the word, number two is the second, etc. Once students have learned other features of the map such as rivers, cities, and mountains, the first letter of each of these can also be used. Students are thus reviewing locations and learning to spell various words.

Various modifications can be made to the present invention without departing from the apparent scope hereof. Other subject areas can be included such as time line map, English, biology, biblical maps, regional maps, or a city map, such as for real estate personnel.

I claim:

1. Process of teaching geography, history, economics, current events, etc. comprising the steps of:
    a. silk screening a map on a large piece of loop material; and,
    b. hooking information tabs with hooks to a predetermined location on said silk screened loop material whereby said tabs provide feedback to a user of correlating information on each of said tabs to said map.

2. Process of claim 1 wherein said tab is a stiff material.

3. Process of claim 1 wherein said tab is a polymer material.

* * * * *